United States Patent [19]

O'Hara

[11] 3,904,552

[45] Sept. 9, 1975

[54] DEHYDROGENATION CATALYST

[75] Inventor: Francis Joseph O'Hara, Louisville, Ky.

[73] Assignee: Girdler Chemical Inc., Louisville, Ky.

[22] Filed: Mar. 8, 1973

[21] Appl. No.: 339,304

[52] U.S. Cl............. 252/458; 252/455 R; 252/462; 252/470; 260/290 R; 260/290 P; 260/683.3
[51] Int. Cl.² ................. B01J 29/00; B01J 23/64; B01J 23/84; B01J 29/06
[58] Field of Search........ 252/458, 462, 455 R, 470

[56] References Cited
UNITED STATES PATENTS

| | | | |
|---|---|---|---|
| 1,301,151 | 4/1919 | Mittasch | 252/462 X |
| 2,716,118 | 8/1955 | Cislak | 252/458 X |
| 2,716,119 | 8/1955 | Cislak | 252/458 X |
| 2,815,331 | 12/1957 | Ashley et al. | 252/470 X |
| 2,916,531 | 12/1959 | Armstrong et al. | 252/458 X |
| 3,293,279 | 12/1966 | Young et al. | 252/462 X |
| 3,325,504 | 6/1967 | Grasselli | 252/462 X |
| 3,345,286 | 10/1967 | Kovach et al. | 252/462 X |
| 3,383,329 | 5/1968 | Young et al. | 252/462 X |
| 3,424,808 | 1/1969 | Brewer et al. | 252/470 X |
| 3,518,208 | 6/1970 | Schneider | 252/470 X |

Primary Examiner—Paul F. Shaver
Attorney, Agent, or Firm—Edward M. Steutermann

[57] ABSTRACT

A molybdenum and cerium promoted iron oxide catalyst is unexpectedly superior in promoting the dehydrogenation of ethylbenzene to styrene.

8 Claims, No Drawings

DEHYDROGENATION CATALYST

This invention relates generally to the production of olefins by dehydrogenation and more specifically to the composition and use of an improved dehydrogenation catalyst.

Considerable research has been directed in the past toward improving the production of butadiene and styrene by catalytic dehydrogenation because these products have been found to be valuable as intermediates in the production of synthetic elastomers. Steam active dehydrogenation catalysts are widely used in the dehydrogenation of olefins to diolefins e.g., butenes to butadienes; alkyl aromatics to alkenyl aromatics, e.g., ethylbenzene to styrene and alkyl pyridines to alkenyl pyridines, e.g., 2-methyl-5-ethyl-pyridine to 2-methyl-5-vinyl pyridine. These catalysts and the dehydrogenation conditions and other operating data are disclosed in Pitzer, U.S. Pat. No. 2,866,790; Gutzeit, U.S. Pat. No. 2,408,140, and Eggertsen et al., U.S. Pat. No. 2,414,585. The steam active alkalized iron dehydrogenation catalysts disclosed in these patents contain a predominant amount of iron oxide and potassium carbonate with a minor but effective amount of chromium oxide incorporated therein as a stabilizer or structural promoter.

Plants for dehydrogenation processes are normally operated at high throughput rates. Thus, even small improvements in the selectivity and activity of a dehydrogenation catalyst result in substantial savings. It is very difficult, though, to obtain a catalyst which has both high selectivity and high activity because, generally, high selectivity is accompanied by low activity and vice versa. Activity of the catalyst is defined as the percent of the starting material, e.g., ethylbenzene, which is converted to some other material during the dehydrogenation process. In other words, it is the total conversion effected by the catalyst. Selectivity of the catalyst is defined as the ratio of the yield of styrene from the ethylbenzene to the total conversion.

A high conversion to styrene by the catalytic dehydrogenation of ethylbenzene is favored by a high temperature and a low pressure. There are also two major undesirable side reactions which simultaneously occur to produce benzene and toluene. The side reactions go to completion and are not limited by equilibrium considerations. Their temperature coefficients are usually greater than the main reaction and thus a high temperature may increase the yield of by-products. However, a low temperature is not desirable since it is known that the conversion of ethylbenzene decreases as the temperature is decreased. A highly active but also highly selective catalyst is, therefore, the ideal.

One method of overcoming the dilemma has been the establishment of a rising temperature profile throughout the reactor. A relatively low temperature is maintained at the reactor inlet where the main reaction is far removed from equilibrium and and a high temperature is maintained at the outlet where the rate of the main reaction to styrene is very low. This requires careful control of several different temperataures and still causes the production of excessive amounts of by-products if a catalyst having poor selectivity is used.

MacFarlane, in U.S. Pat. No. 3,223,743, teaches the use of a catalyst bed having at least two layers of catalyst, one of which is highly active and the other highly selective. The highly selective catalyst layer contains 49% iron oxide, potassium pyrophosphate as a water gas promoter, calcium aluminate as a binder, and 2.5% chromium oxide and 1% cerium oxide as structural promoters. The highly active catalyst layer is exemplified by one containing 90% iron oxide plus potassium oxide and chromium oxide.

Fleming et al., U.S. Pat. No. 2,990,432 teaches an alkali promoted iron oxide catalyst to which a hydraulic cement such as Portland cement is added for the purpose of increasing the physical strength and improving both the selectivity and activity of the catalyst. Chromic oxide is the structural promoter in each catalyst described in the working examples of Fleming et al.

It has now been discovered that a single steam active alkalized iron dehydrogenation catalyst containing minor but effective amounts of cerium oxide and molybdenum oxide but no chromium oxide promotes a highly selective dehydrogenation at a high overall conversion level and possesses other desirable properties which may be used to great advantage in the production of olefinic compounds.

It is, therefore, a principal object of this invention, to provide a novel catalyst for the production of olefinic compounds by the dehydrogenation of the corresponding more saturated materials. It is another object of this invention to provide an improved catalyst having both a high activity and a high selectivity in the dehydrogenation ethylbenzene to styrene. It is another object to provide an improved process for the production of olefinic compounds. Another object is to provide a process for the catalytic dehydrogenation of ethylbenzene to styrene wherein both the total conversion of ethylbenzene and the ratio of styrene to total product are high. A still further object is to provide a novel catalyst which may be activated within a very short "line-out" period. Yet another object is to provide a catalyst which is more active after regeneration than before.

The advantages just expressed as objectives are embodied in the catalyst of this invention which comprises iron oxide, a minor amount of a water gas promoter, from about 0.5% to about 10% by weight of cerium oxide, and from about 0.5% to about 5% by weight of molybdenum oxide.

The iron oxide customarily used is of pigmentary grade but is may also be prepared by the thermal decomposition of ferric nitrate, ferric oxalate, ferrous sulfate and the like. The iron oxide in the finished catalyst is usually in the $\alpha$-form. The iron oxide may constitute from about 30% to about 90% by weight of the catalyst but it is preferably within the range of from about 40% to about 90%. Even more preferably the iron oxide is from about 55% to about 90% of the total weight of the catalyst.

Compounds of the alkali metals such as the oxides, hydroxides, carbonates, and bicarbonates, of potassium, cesium, rubidium, and sodium are useful as water gas promoters. Potassium carbonate is preferred. Usually this promoter is incorporated into the catalyst in amounts of from about 1% to about 40% by weight although small amounts may be added initially and from time to time during use of the catalyst to replenish what may be lost. A preferred catalyst contains from about 5% to about 25% by weight of the water gas promoter.

A critical feature of this invention is the discovery that the combination of cerium oxide and molybdenum oxide has a more beneficial effect on the activity and selectivity of a steam active alkalized iron oxide dehydrogenation catalyst than does either one alone. The replacement of the chromic oxide in a standard catalyst of the type described in Fleming et al. in U.S. Pat. No. 2,990,432 with an equal weight of molybdenum oxide gives a catalyst that is much less active than the chromic oxide containing catalyst or one containing cerium oxide instead of chromic oxide or even one containing no structural promoter at all. Surprisingly, a catalyst of the same type containing molybdenum oxide and cerium oxide in place of chromic oxide is more active and more selective than either the cerium promoted catalyst or the chromium promoted catalyst.

A preferred catalyst of this invention usually contains from about 1% to about 8% cerium oxide, more preferably from about 2% to about 6% and, still more preferably, from about 4% to about 6% of the total weight of the catalyst. Cerium is introduced into the catalyst during preparation as a compound such as, e.g., the nitrate, carbonate, or hydrate but these are converted to the oxide during calcination.

The molybdenum oxide is usually from about 1% to about 5% of the total catalyst weight but it is preferably from about 2 to about 4% by weight. From the above it can be seen that the more preferred catalyst will contain from about 4 to about 6% of cerium oxide and from about 2 to about 4% of molybdenum oxide.

A binding agent which adds to the physical strength of the catalyst may also be incorporated. A hydraulic cement, such as a Portland cement which, after calcination, contains calcium oxide or another compound not chemically combined with aluminum or silicon compounds and which is therefore available to exert an effect upon the physical properties of the iron oxide, is preferred. The catalyst may contain from about 5% to about 30% by weight of a binding agent but in one embodiment of the invention the binding agent is preferably from about 10 to about 20% of the total weight.

The iron oxide, water gas promoter, molybdenum oxide, and, optionally, the cement are finely divided prior to being mixed together in the dry state. Insoluble cerium compounds may be mixed with the other dry ingredients but when a soluble cerium salt, such as the nitrate, is used it is preferable to make an aqueous solution of the salt and mix it with the dry mixture. In any case, sufficient water is mixed with the dry solids to form a plastic mass. This mass may be shaped into pellets, pills, tablets, spheres, saddles, rings and the like. Extruded pellets having a diameter from 1/16 inch to 3/16 inch are often prepared. The formed catalyst paste is then dried and calcined in air at from about 600°F. to about 1800°F. to provide an internal surface area not greater than about 7 square meters per gram ($m^2/g$) and preferably from about 0.5 to about 3.5 $m^2/g$ when a binder is not used and from about 4 to about 6 $m^2/g$ when a binder is used.

X-ray diffraction analysis of a calcined catalyst of this invention containing Portland cement reveals the presence of $\alpha$-$Fe_2O_3$, $CaCO_3$, $K_2Ca(CO_3)_2$, $CeO_2$, $MoO_3$ and $\alpha$-quartz.

The catalyst of this invention is also more resistant to physical deterioration in service than a corresponding chromium promoted catalyst, as shown by the amount of fines present in the catalyst charges after each had been on stream during the dehydrogenation of ethylbenzene at 1100°F. and a liquid hourly space velocity of 2.0 for about 770–890 hours. The chromium promoted catalyst had deteriorated to such an extent that fines smaller than 7 mesh constituted 37.4% of the catalyst weight. The substitution of cerium for chromium in the catalyst caused a great improvement — 13.6% fines smaller than 7 mesh — but only 8.7% of the catalyst of this invention passed through a 7 mesh screen. The increased surface area which would result from the accumulation of such fines may explain an apparent increase in activity of the chromium promoted catalyst which was noted near the end of a 900 hour life test after a previous decline in activity. In spite of this apparent increase in activity, a catalyst of this invention is still more active than the chromium containing catalyst after at least 772 hours. The accumulation of fine catalyst particles in a dehydrogenation reactor may cause a serious pressure drop across the catalyst bed, which if allowed to build up, would force a premature shut down of the process if a plant did not have the necessary equipment to apply a sufficient pressure head at the reactor inlet. The dehydrogenation reaction is adversely affected by high pressure, also.

A further unexpected advantage of the catalyst of this invention is the short activation period needed. Catalyst No. 1 of Table I, for example, had reached about 96% of its full activity level after about 16 hours of a "lining out" period whereas the prior art catalyst was at only about 84% of its on stream activity at that time.

Another surprising feature of the catalyst of this invention is its response to regeneration after partial deactivation. The catalyst of this invention is actually more active after being regenerated than it is after the initial line-out period.

The use of the catalyst of this invention in a dehydrogenation process, therefore, represents an improvement over what has been taught in the art. In addition to its utility in the dehydrogenation of ethylbenzene to styrene, the improved process of this invention is applicable for use in the dehydrogenation of various other aromatic hydrocarbons having an alkyl side chain of at least two carbon atoms such as, for example, propylbenzene, diethylbenzene, ethyltoluene, propyltoluene, ethylnaphthalene, diethylnaphthalene, diethyldiphenyl, and the like. Likewise, the process of the invention is suitable for use in the production of diolefins, for example, butadiene and other conjugated diolefins such as piperylene, isoprene, the various hexadienes, and the like by dehydrogenation of the corresponding monoolefins. The process is also useful in the production of olefinically unsaturated pyridines by the dehydrogenation of pyridines having an alkyl substituent of at least two carbon atoms. Examples of such pyridines include the above mentioned 2-methyl-5-ethyl pyridine, the ethyl- and diethylpyridines, and the like.

In use, a charge of the catalyst of this invention is placed in a reactor and a feed gas of steam and, for example, ethylbenzene, at a molar ratio of from about 1:1 to about 30:1, usually about 15:1 to about 18:1, is conducted from a preheater through the catalyst bed at a liquid hourly space velocity of from about 0.3 to about 2, preferably from about 0.5 to 1. The pressure of the feed gas is maintained at from about 0 to about 20 p.s.i.g. and the temperature within the reactor is maintained at from about 1000°F. to about 1200°F. The effluent gas is condensed in a water cooled condenser and the condensate is collected. Non-condensible gas is vented to a burner or collected and compressed for subsequent separation and use of the components.

The following examples are provided to more fully illustrate the invention and to demonstrate the surprising advantages of a catalyst promoted with a combination of cerium oxide and molybdenum oxide in a dehydrogenation process. All parts are by weight unless otherwise stated.

EXAMPLE 1

In accordance with this invention a catalyst paste is prepared by thoroughly mixing the following components

|  | Parts by weight |
| --- | --- |
| $Fe_2O_3$ | 1800 |
| $K_2CO_3$ | 630 |
| Portland cement | 345 |
| $MoO_3$ | 75 | in a muller and then adding a solution of 397 parts of $Ce(NO_3)_3 \cdot 6H_2O$ (calculated to furnish 150 parts of $Ce_2O_3$) in 500 parts of water and mulling the wet mixture while an additional 150 parts of water is added to adjust the consistency of the paste for extrusion. The paste is then extruded to form pellets having 1/8 inch diameter. The pellets are dried and calcined in air according to the following schedule: 1 hour at 250°F., 1 hour at 450°F., 2 hours at 650°F., and 4 hours at 950°F. The surface area of the catalyst is 5.1 m²/gram. Elemental analysis shows that the catalyst contains 39.3% Fe, 4.48% Ce, 1.63% Mo, 12.0% K and 4.75% Ca. The Fe, Ca, and Mo contents are equivalent to 56.2% $Fe_2O_3$, 5.25% $Ce_2O_3$ and 2.45% $MoO_3$, respectively. This is Catalyst No. 1 in Table I below.

EXAMPLE 2

A catalyst is prepared according to the general procedure of Example 1 except that 555 parts of $K_2CO_3$ and 150 parts of $MoO_3$ are used. The surface area of the catalyst is 4.3 m²/gram. The iron, cerium and molybdenum contents found by analysis correspond to 58.0% $Fe_2O_3$, 5.33% $Ce_2O_3$, and 4.58% $MoO_3$. This is Catalyst No. 2 in Table I.

EXAMPLE 3

A catalyst is prepared according to the general procedure of Example 1 except that 675 parts of $K_2CO_3$ and 30 parts of $MoO_3$ are used. The surface area is 5.1 m²/gram. The iron, cerium, and molybdenum contents found by analysis correspond to 54.8% $Fe_2O_3$, 5.36% $Ce_2O_3$, and 0.93% $MoO_3$. This is Catalyst No. 3 in Table I.

EXAMPLE 4

A mixture of 2028 parts of ferric oxide (needles, approximately 2 microns, 99.2% $Fe_2O_3$) 507 parts of hydrated ferric oxides (needles, approximately 0.6 micron, 99% $Fe_2O_3$, 0.3% $H_2O$), 300 parts of potassium carbonate and 75 parts of molybdenum oxide is mulled in the dry state until uniform. Then a solution of 400 parts of cerium nitrate hexahydrate, calculated to give 4.9% cerium oxide in the calcined catalyst, in 400 parts of water is added to the mixture while mulling is continued. The resulting paste is extruded through a pellet mill having a ⅛ inch die. The pellets are dried and calcined according to the schedule: 2 hours at 250°F., 2 hours at 450°F., 2 hours at 700°F., 4 hours at 925°F., and 4 hours at 1400°F. The surface area is 2.4 m²/gram. The elemental analysis of the catalyst shows that it contains 59.2% iron, 4.97% cerium, and 1.53% molybdenum, equivalent to 84.6% $Fe_2O_3$, 5.82% $Ce_2O_3$, and 2.30% $MoO_3$, respectively.

EXAMPLE 5

Catalyst Nos. 1, 2, and 3 are tested in a 1 inch diameter stainless steel reactor. In each test, 100 cc. of catalyst is placed in the reactor to rest on a perforated stainless steel plate. Preheated steam and ethylbenzene are passed through the catalyst at 1100°F., at a steam to ethylbenzene ratio of 2:5:1 by weight (about 15 moles to 1 mole), a back pressure of 4 p.s.i.g. and at the liquid hourly space velocities (LHSV) shown in Table I. Duplicate liquid product samples are taken after each condition has been stabilized for 2 hours. Each sample represents at least 0.5 hour of operation.

Catalysts 1, 2, and 3 were compared with a catalyst of the prior art which contains 2.5% chromium oxide, prepared according to the general procedure of Example 1 except that 780 parts of $K_2CO_3$ are used and 75 parts of $Cr_2O_3$ are used in place of the $MoO_3$ and $Ce(NO_3)_3 \cdot 6H_2O$. The conversion and selectivity found for each of the tested catalysts is given in Table I.

TABLE I

| Catalyst | LHSV | | | | | |
| --- | --- | --- | --- | --- | --- | --- |
| | 0.5 | | 1.0 | | 2.0 | |
| | C | S | C | S | C | S |
| 1 | 61.1 | 93.1 | 56.3 | 96.3 | 47.0 | 97.6 |
| 2 | 59.7 | 93.8 | 51.8 | 96.5 | 43.6 | 97.7 |
| 3 | 57.8 | 93.6 | 55.2 | 96.0 | 47.4 | 97.3 |
| Prior Art | 59.9 | 90.3 | 52.7 | 93.9 | 40.4 | 96.0 |

C=conversion,
S=selectivity

The conversion and selectivity values found when the same 4 catalysts were tested at 1150°F. are shown in Table II.

TABLE II

| Catalyst | LHSV | | | | | |
| --- | --- | --- | --- | --- | --- | --- |
| | 0.5 | | 1.0 | | 2.0 | |
| | C | S | C | S | C | S |
| 1 | 76.3 | 88.8 | 73.5 | 92.9 | 67.1 | 95.4 |
| 2 | 75.5 | 87.9 | 69.6 | 91.4 | 61.8 | 94.2 |
| 3 | — | — | 72.7 | 91.3 | 64.8 | 94.7 |
| Prior Art | 73.4 | 85.3 | 69.2 | 90.3 | 59.2 | 93.4 |

Numerous modifications of this invention will be readily apparent to those skilled in the catalyst art; such modifications may be made without departing from the spirit of this invention, the scope of which is commensurate with the following claims.

I claim:

1. A catalyst for the production of an olefinically unsaturated hydrocarbon or pyridine by dehydrogenation of the corresponding more saturated compound consisting essentially of from about 30 to about 90% of iron oxide, from about 1% to about 40% of a compound selected from the group consisting of the oxides, hydroxides, carbonates and bicarbonates of an alkali metal, from about 0.5% to about 5% of molybdenum oxide and from about 0.5% to about 10% of cerium oxide.

2. The catalyst of claim 1 wherein the iron oxide constitutes from about 40% to about 90% of the total weight.

3. The catalyst of claim 1 wherein the cerium oxide is from about 2% to about 8% of the total weight.

4. The catalyst of claim 1 wherein the cerium oxide is from about 4% to about 6% of the total weight.

5. A catalyst for the production of an olefinically unsaturated hydrocarbon or pyridine by dehydrogenation of the corresponding more saturated compound consisting essentially of from about 30% to about 90% of iron oxide, from about 1% to about 40% of a compound selected from the group consisting of the oxides, hydroxides, carbonates, and bicarbonates of an alkali metal, from about 0.5% to about 5% of molybdenum oxide, and from about 0.5% to about 10% cerium oxide and from about 5% to about 30% of a binding agent.

6. The catalyst of claim 1 wherein the molybdenum oxide is from about 2% to about 4% of the total weight.

7. The catalyst of claim 4 wherein the molybdenum oxide is from about 2% to about 4% of the total weight.

8. The catalyst of claim 5 wherein the cerium oxide is from about 2% to about 4% of the total weight and the binding agent includes from about 5% to about 30% of Portland cement.

* * * * *